United States Patent
Gafton (10) Patent No.: US 11,385,919 B1
(45) Date of Patent: Jul. 12, 2022

(54) MACHINE IMAGE LAUNCH SYSTEM

(71) Applicant: AMAZON TECHNOLOGIES, INC., Seattle, WA (US)

(72) Inventor: Cristian Gabriel Gafton, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1161 days.

(21) Appl. No.: 15/208,023

(22) Filed: Jul. 12, 2016

(51) Int. Cl.

| | |
|---|---|
| G06F 9/455 | (2018.01) |
| G06F 16/51 | (2019.01) |
| G06F 16/188 | (2019.01) |
| G06F 9/50 | (2006.01) |
| G06F 8/658 | (2018.01) |
| G06F 8/61 | (2018.01) |
| G06F 16/58 | (2019.01) |
| G06F 8/71 | (2018.01) |

(52) U.S. Cl.
CPC .......... *G06F 9/45558* (2013.01); *G06F 8/658* (2018.02); *G06F 16/188* (2019.01); *G06F 16/51* (2019.01); *G06F 16/5866* (2019.01); *G06F 8/63* (2013.01); *G06F 8/71* (2013.01); *G06F 9/5005* (2013.01); *G06F 9/5077* (2013.01); *G06F 2009/4557* (2013.01)

(58) Field of Classification Search
CPC . G06F 9/5061; G06F 9/45558; H04L 41/5054
See application file for complete search history.

(56) References Cited

U.S. PATENT DOCUMENTS

| | | | |
|---|---|---|---|
| 8,443,077 B1 * | 5/2013 | Lappas ................. | G06F 9/5077 709/224 |
| 8,856,486 B2 * | 10/2014 | Sharp .................... | G06F 3/0614 711/173 |
| 2005/0198303 A1 * | 9/2005 | Knauerhase .......... | G06F 9/5055 709/227 |
| 2006/0174238 A1 * | 8/2006 | Henseler ................. | G06F 8/63 717/168 |

(Continued)

OTHER PUBLICATIONS

Echeverría, Sebastián, et al. "On-demand vm provisioning for cloudlet-based cyber-foraging in resource-constrained environments." Nov. 6, 2014. Mobile Computing, Applications and Services (MobiCASE), 2014 6th International Conference—IEEE.*

(Continued)

*Primary Examiner* — Lewis A Bullock, Jr.
*Assistant Examiner* — Gilles R Kepnang
(74) *Attorney, Agent, or Firm* — Thomas | Horstemeyer, LLP (57) ABSTRACT

A service provider network includes a database that has one or more "base" machine images and, for one or more of the base machine images, one or more predetermined "optimized" machine images. Each base and optimized machine image are stored in the database and selected based on certain user inputs to create a customer-desired virtual machine instance on a host computer. An optimized machine image is a version of a particular base machine image to which one or more optimizations have been applied. The database may contain complete optimized machine images or data bits that, when applied to a base machine image, result in the optimized machine image.

18 Claims, 5 Drawing Sheets

(56) References Cited

U.S. PATENT DOCUMENTS

| | | | |
|---|---|---|---|
| 2010/0169477 A1* | 7/2010 | Stienhans | G06F 9/5083 709/224 |
| 2010/0205375 A1* | 8/2010 | Challener | H04L 29/08846 711/E12.017 |
| 2012/0131577 A1* | 5/2012 | Arcese | G06F 8/60 718/1 |
| 2013/0007726 A1* | 1/2013 | Poddar | G06F 8/63 717/175 |
| 2013/0055258 A1* | 2/2013 | De | G06F 9/45533 718/1 |
| 2013/0326503 A1* | 12/2013 | De | G06F 9/45558 718/1 |
| 2013/0339470 A1* | 12/2013 | Jeswani | H04L 67/1097 709/213 |
| 2014/0136711 A1* | 5/2014 | Benari | G06F 9/5061 709/226 |
| 2014/0365626 A1* | 12/2014 | Radhakrishnan | H04L 41/5054 709/222 |
| 2015/0081910 A1* | 3/2015 | Assuncao | G06F 9/45558 709/226 |
| 2015/0339149 A1* | 11/2015 | Tian | G06F 8/63 711/114 |
| 2015/0370593 A1* | 12/2015 | Kuroda | G06F 9/45558 718/1 |
| 2016/0337445 A1* | 11/2016 | Kono | G06F 8/61 |
| 2017/0177860 A1* | 6/2017 | Suarez | G06F 21/53 |
| 2017/0262466 A1* | 9/2017 | Amit | G06K 9/66 |
| 2017/0372173 A1* | 12/2017 | Kairali | G06K 9/6218 |
| 2017/0372322 A1* | 12/2017 | Morey | G06Q 30/016 |
| 2018/0113734 A1* | 4/2018 | Yamato | G06F 11/301 |

OTHER PUBLICATIONS

Von Laszewski et al. Jun. 24, 2012. Comparison of multiple cloud frameworks. In 2012 IEEE Fifth International Conference on Cloud Computing (pp. 734-741). IEEE. (Year: 2012).*

* cited by examiner

| MI ID | Coresp'ing base MI ID | Metadata | MI |
|---|---|---|---|
| 123 | 123 | | MI locator |
| 123.1 | 123 | | MI locator |
| 123.2 | 123 | | MI locator |
| 250 | 250 | | MI locator |
| 250.1 | 250 | | MI locator |
| | ... | | |

| MI ID | Corr'ing base MI ID | Metadata | MI, overlay bits | Overlay instr. |
|---|---|---|---|---|
| 123 | 123 | |  | N/A |
| 123.1 | 123 | |  | |
| 123.2 | 123 | |  | |
| 250 | 250 | | | N/A |
| 250.1 | 250 | | | |
| | ... | | | |

MACHINE IMAGE LAUNCH SYSTEM

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers have increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

The creation of a virtual machine may include loading a host computer with an image of a virtual machine. The virtual machine image may include the operating system, data files, and applications. A customer may select a particular pre-stored virtual machine image to form the basis of his or her virtual machine but may then have to apply various optimizations or patches.

BRIEF DESCRIPTION OF THE DRAWINGS

For a detailed description of various examples, reference will now be made to the accompanying drawings in which.

DETAILED DESCRIPTION

The disclosed embodiments relate to selecting and loading a suitable machine image to create a virtual machine instance (also referred to herein as a "virtual machine" or an "instance"). One or more modifications to a machine image can be made at launch time of the underlying machine image. Such modifications are also referred to herein as "optimizations." Examples of such optimizations include the application of security patches to the machine image, application of a firewall, application of antivirus software, etc. A security patch may fix a problem with an application or operating system. The process of optimizing a machine image is generally a manual process coordinated by a customer of the service provider when launching instances. The optimization process may be time-consuming. Further, the customer may be forced to repeat the optimization process for each instance launched.

In accordance with the disclosed embodiments, a service provider network may include a database that includes references to one or more "base" machine images and, for one or more of the base machine images, one or more predetermined "optimized" machine images. The images (e.g., binary images, including, for example, operating systems, file systems, applications, and the like) may be stored in a data store, such as a storage service. Each image, optimized machine image, and/or modification to apply to a base image can have an associated identifier that is stored in the database. References for each base and optimized machine image is stored in the database and selected based on certain user inputs to create a customer-desired virtual machine instance on a host computer. An optimized machine image is a version of a particular base machine image to which one or more modifications such as patches or application installations have been applied. The collection of one or more modifications made to a particular base machine image is referred to herein as an optimized machine image. A base machine image may comprise a machine image that itself has been previously modified. Each machine image comprises a binary that represent the operating system, drivers, etc.

Because optimized machine images have been precomputed and are available for creating a virtual machine instance, the manual process of downloading and applying various modifications to the machine image is avoided and thus the time required to launch a virtual machine instance and make it available for use to the customer is reduced. As a result, all else being equal the provider network will function more efficiently and faster during the virtual machine instance launch phase.

Figure 1:
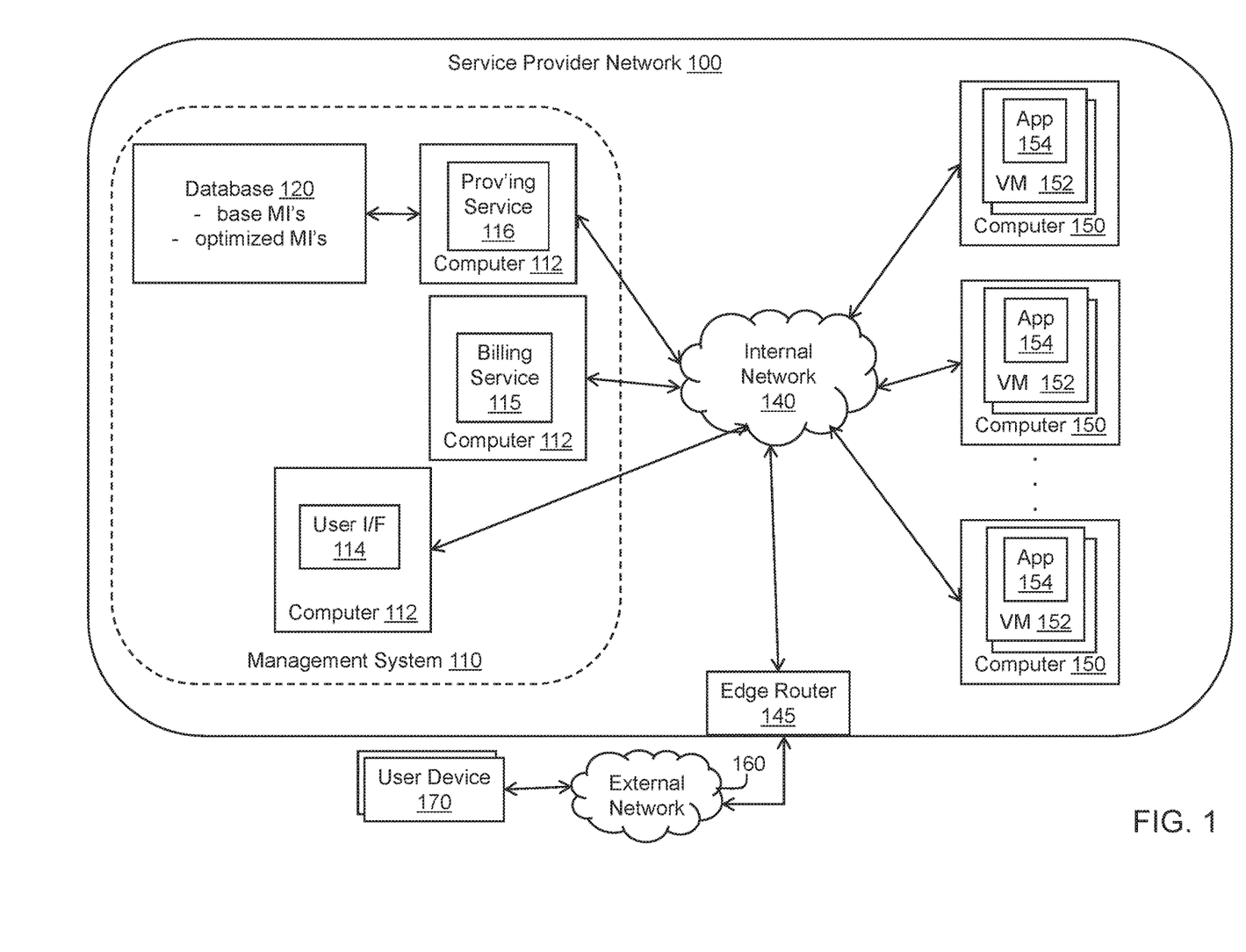
FIG. 1 shows a system in accordance with various examples.

FIG. 1 shows an embodiment of a service provider network 100 on which instances can be created, terminated and otherwise managed on behalf of customers of the service provider. In this example, the service provider network may include a management system 110 coupled to multiple computers 150 through an internal network 140. Each computer 150 includes one or more processors, memory, network interfaces and other hardware and support software. The computers 150 may comprise, for example, servers housed in racks.

Each computer 150 may execute one or more virtual machine instances 152. A virtual machine instance 152 is a software implementation of a physical computer system. Virtual machines may provide for multiple and/or different operating system environments to run concurrently on a single computer 150 having a processor and memory. In one example, multiple virtual machines of a Linux® operating system environment may execute concurrently with multiple instances of a Microsoft® Windows® operating system environment on a single physical computer. A virtual machine may include or interact with a hypervisor or a virtual machine monitor (or other type of virtualization system) which are programs that execute on the physical computer that allow multiple guest operating systems to share a single hardware host. Each operating system appears to have exclusive access to the host's processor, memory, and other resources. However, the hypervisor controls the host processor and resources, allocating what is needed to each instance's operating system in turn and making sure that the guest operating systems of the virtual machines cannot disrupt each other. Each virtual machine is controlled by a respective customer.

Once the customer's instances 152 are created, the customer can load each virtual machine instance with whatever customer-specific applications 154 the customer so chooses. The customer's applications may comprise web server applications, data processing applications, or any other type of back-end functionality that the customer wants to provide to that customer's clients.

The customers can access the management system 110 to request instances 152 to be created and terminated by communicating with web servers associated with the management service (not illustrated). Customers may use user devices 170 to communicate with the web servers for the management system 110 of the provider network 100. The user devices 170 may include personal computers (e.g., notebook computers, desktop computers, etc.), tablet devices, smart phones, personal digital assistants, and other types of electronic devices. A user device may include a processor, memory, and a network interface (wired or wireless) by which the device accesses the provider network 100 through an external network 160. The external network 160 may include one or more local area networks (wired or wireless LANs) and a wide area network such as the Internet and its communication infrastructure. The provider network 100 may include an edge router 145 that provides an interface for external devices such as user devise 170 to access the provider network. Through the edge router 145 and internal network, a customer device 170 can communicate with one or more services executing within the management system 110. Clients of the customers also can access the applications 154 executing on the computers 150 through of user devices 170.

The management system 110 includes various services that may be implemented as applications that execute on computers 112. A variety of management system services may be provided by the service provider. Examples management system services include a provisioning service 116 (including constituent sub-services) which performs actions such as creating instances, terminating instances, and configuring and reconfiguring the instances. Through the provisioning service 116, a customer can create multiple instances associated with that customer's account. As such, each customer account may be used to create a group of instances and there may be multiple (and typically many) customer accounts. In general, access to one customer account only permits instances to be created and managed under that account, and does not grant the customer management access to the instances under another account. Multiple groups of instances may be created under a single customer account, and a customer may have multiple accounts.

The management service 110 also may include a user interface 114 and a billing service 115, which may include code that executes on a computer 112. The user interface 114 may implement an application programming interface (API) service, which receives APIs from customers via their user devices 170 to effectuate any of a variety of management controls over the services offered by the provider network 100. In one embodiment, the user interface 114 may provide a graphical user interface (GUI) through a web application. The GUI may be provided to, and displayed on, a web browser that executes on a user device 170. In other embodiments, customers supply APIs through a script or command line interface to the user interface 114 without a web browser-enabled GUI. The billing service 115 keeps track of services and features that each customer uses and the per unit price of each such service and feature, and charges the account of each customer appropriately.

One of the functions that a customer can request the provider network to execute is to create an instance 152 on a host computer 150. In some embodiments, the process for creating an instance includes selection of a region or zone in which the instance is to be created (to the extent the service provider offers multiple regions and/or multiple zones within a region), selection of a type of instance, and selection of a machine image to form the basis of the instance. The instance type refers to a hardware configuration of the instance. Some instances may be compute-optimized, while other instances are memory-optimized, while still other instances are general purpose instances. Different types of instances may have different types of central processing units (CPUs), different types of memory, different numbers of network ports, etc. Further, the number of CPUs and the amount of memory may vary from instance type to instance type.

Once a customer has selected the particular type of instance to be launched on a host computer 150, the customer also selects a machine image. A machine image provides the information required to launch the instance. A machine image may include a template for the root volume for the instance. The template may include, for example, an operating system, an application server, and one or more applications. Different machine images may include different operating systems or different versions of an operating system.

The management system 110 includes, or has access to, a machine instance database 120, which includes references to one or more base machine images, while the base machine images themselves are stored in storage. The machine image database 120 may be accessible to the provisioning service 116 either directly or via the internal network 140. In some embodiments, a base machine image may be a machine image that has not been optimized in anyway. In other embodiments, a base machine image may have been optimized to some extent and now forms a base machine image for further optimizations.

A customer can select a machine image using their user device 170. The customer may select from a drop-down list of machine images, for example. Customers can scan through a description of the various machine images and select the one that best suits their needs. Each machine image is assigned, for example by the service provider, a machine image identifier that uniquely identifies each such machine image. The machine image identifier may be an alphanumeric character string, or other form of identifier. In accordance with the disclosed embodiments, a customer can select a particular machine image and also specify one or more other parameters related to the machine image or resulting instance. Such parameters may be used by the provisioning service 116 to select a pre-determined optimized machine image on behalf of the customer. One or more optimized machine images corresponding to a given base machine image may be stored in storage accessible by management system 110 using information stored in machine image database 120. The customer selects the base image and may specify some additional parameters regarding specific optimizations to the machine image that the customer requires, and the provisioning service 116 determines whether a machine image exists in the database 120 that matches the selected base image as optimized as specified by the customer. If such an optimized machine image exists in database 120, then the provisioning service 116 uses the machine image identifier to select the optimized machine image for the customer and creates an instance for the customer using the optimized machine image.

Figure 2:
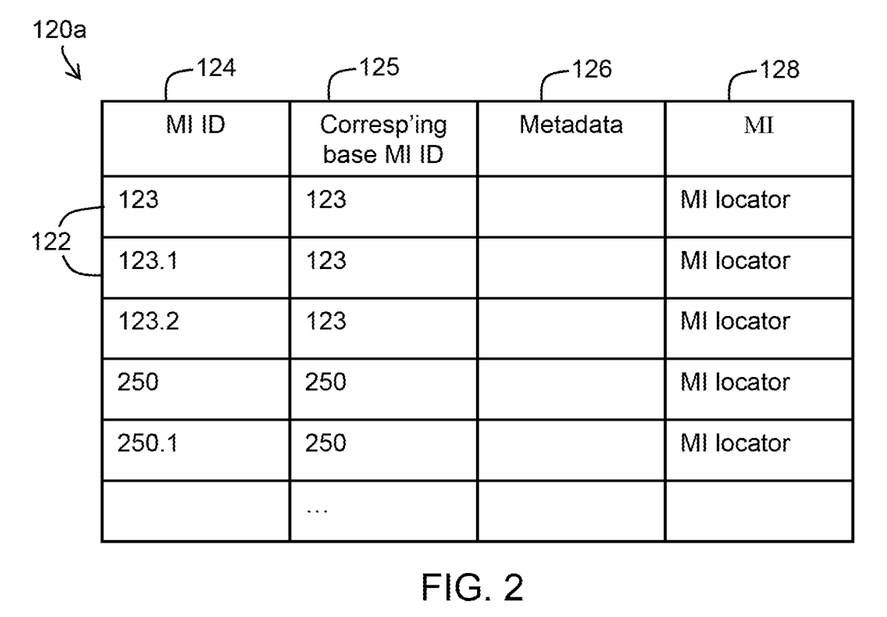
FIG. 2 shows an embodiment of a machine image database in accordance with various examples.

In some embodiments, a machine image is optimized by, for example, applying one or more modifications (e.g., security patches) to it, saving in storage as a new (optimized) machine image, and assigning a unique machine identifier to the new machine image. FIG. 2 shows an example of an implementation of the machine image database 120 (referenced in FIG. 2 as machine image database 120*a*). The illustrative machine image database 120*a* of FIG. 2 includes multiple records 122, one record for each machine image. Each record includes a machine image identifier (MI ID) 124, a corresponding base MI ID 125, metadata 126, and a machine image locator 128 to where the machine image is stored in storage.

In the example of FIG. 2, the first three machine identifiers are "123", "123.1", and "123.2". The machine images corresponding to these identifiers include a base machine image (mapped to machine image identifier 123) and two differently optimized machine images 123.1 and 123.2. That is, the machine images that map to identifiers 123.1 and 123.2 are optimized versions of base image 123. The machine image database 120*a* also includes entries containing machine image identifiers 250 and 250.1, which represent a base machine image (identifier 250) and an optimized version 250.1. The corresponding base MI ID 125 refers to the MI ID of a base machine image that corresponds to the optimized machine image in a given record. For example, the corresponding base MI ID is 123 for optimized machine images having MI IDs 123.1 and 123.2. In some embodiments, machine image 123.2 may be an optimized version of machine image 123.1. Thus machine image 123.1 may be an optimized machine image (e.g., a modified version of machine image 123) and also serve as a base machine image to modified machine image 123.2.

The metadata 126 includes any of a variety of parameters about the machine image. Examples include identities of specific security patches (SP ID) that have been applied to the machine image or packages, drivers, or applications that have been installed to instances, that was then turned into a machine image, an identity of a region and/or an availability zone (AZ) in which the instance can be launched, the type of instance on which the machine image is to be loaded, the type or identity of an application to be executed on the virtual machine image, etc. The metadata may include only one parameter or multiple parameters. When the customer attempts to launch a virtual machine and selects a base machine image, the provisioning service 116 uses the optimization parameters specified by the customer regarding the instance to determine if a match is found in the metadata 126 of the database for the corresponding base machine image identifier 125. For example, a customer may specify in a launch instance request an ID of a machine image (e.g., a base machine image ID) and one or more modifications (e.g., identifiers of drivers, applications, packages, patches, etc.) to add to the instance. If a match is found, the provisioning service 116 selects the corresponding optimized machine image. For example, if the customer selects the machine identifier 123 and selects a certain security patch identifier that is stored in the database associated with machine image identifier 123.2, then the provisioning service 116 selects the machine image 128 that corresponds to the machine identifier 123.2 to load onto a host computer 150 for the customer. The provisioning service 116 may automatically load the optimized machine image for the customer for creation of the instance.

Figure 3:
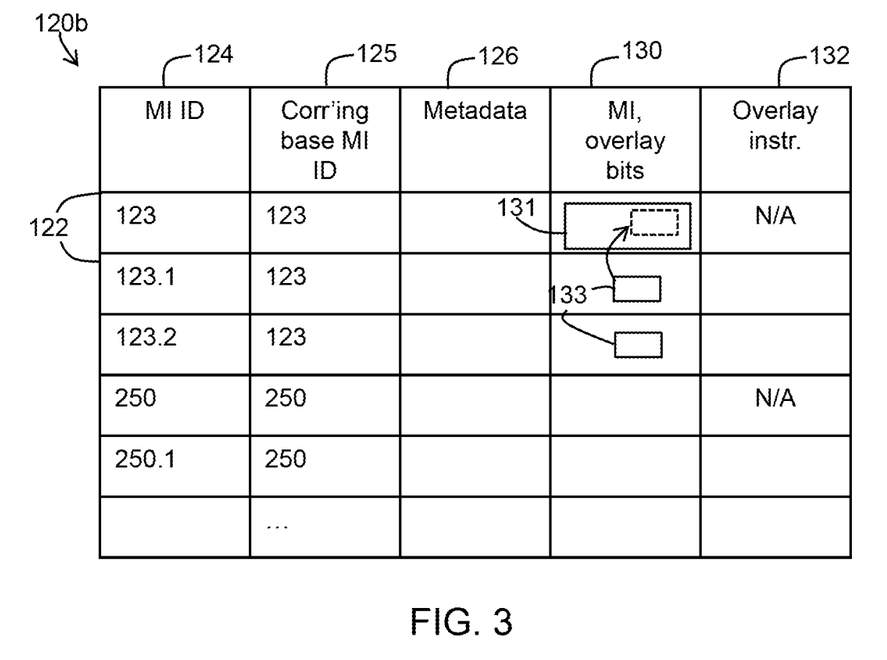
FIG. 3 shows another embodiment of the machine image database.

In the example of FIG. 2, complete copies of optimized machine images are stored in a storage service (not illustrated) and references are stored in database 120*a*. FIG. 3, however, shows an example of a machine image database 120*b* in which each entry 122 corresponds either to a full copy of a base machine image 131 or overlay bit pattern 133 (both of which may be stored in separate storage) that represents the changes to be applied to a base machine image to produce an optimized machine image. Thus, column 130 in the machine image database 120*b* contains references to either a binary for a full machine image or a partial binary of the full machine image that, when applied to a corresponding base machine image, would result in an optimized machine image. The overlay binary 133 is a subset of the binary comprising the base machine image 131. While the figure illustrates column 130 to include a binary of a full machine image or an overlay bit pattern 133 to be applied to a binary of a machine image, it should be understood that column 130 includes references to the location of such information, and not the full or partial binaries themselves— the binaries are shown in FIG. 3 for ease of explanation. The machine image database table 120*b* also includes overlay instructions 132 which specify how the overlay binary is to be applied. The overlay instructions may specify a starting address, offset or other form of identifier to indicate where in the base machine image the overlay is to be applied. In some embodiments, the overlay is read by a virtualization system instead of the parts of the binary the overlay replaces when that part is accessed by the instance. If or when a snapshot is taken of the instance the snapshot includes the overlay and the management system 110 can use the snapshot to make a new base image.

The optimized machine images may comprise machine images that have been determined by the service provider to be, for example, prevalent enough to warrant inclusion in the database. For example, if a particular machine image is repeatedly optimized in a certain way, the service provider may decide to include that particular optimized machine image in the machine image database 120 so that future launches of instances using that machine image can benefit from the service provider having pre-stored the optimized machine in the machine image database 120. The provider network may keep track of the optimizations that are manually applied to each machine image as well as the combinations of modifications that are requested via launch commands and thus the number of times and/or frequency with which a particular machine image is optimized in a certain manner. Once that number or frequency reaches a threshold (or an administrator or customer of the service provider submits a request to create an optimized image), the management system 110 may automatically store, or recommend storage of, a copy of the optimized machine image. In turn, the service provider could use a variety of techniques for creating an optimized machine image, such as by creating multiple virtual disk overlays including a first overlay that stores the binary image of the base image and an overlay that stores a binary of the changes necessary to effectuate the optimized machine image. The overlays could be stored in files in storage with metadata that relates overlays for a machine image to each other. The metadata can be used (e.g., by a hypervisor) to create an optimized machine image from the one or more overlays. In other embodiments, a service executing on a computer as part of the management system 110 may detect that the threshold has been surpassed and trigger an alert (visual, audible, email, text message, pop-up window, etc.) to, for example, a user interface on a management console (not shown). A person may react to the alert by making a decision as to whether to include the optimized machine image in the database 120 and, in the affirmative, causing a copy (e.g., one or more overlays storing changes from a base image) of the optimized machine image to be stored. In other embodiments, the service detecting that the threshold has been surpassed may respond by causing the copy of the optimized machine image to be stored without requesting confirmation via a management console.

An optimized machine image stored in the database 120 may include a software component that carries a particular charge such as a license fee. For example, a machine image may include a free operating system but has a proprietary firewall that requires a specific license fee to be paid to the creator of the firewall. Such fees associated with a given optimized machine image also may be stored in the database record of that machine image and provided to the billing service 115 when a customer request results in the selection of that particular machine image. The billing service uses the fee information associated with the optimized machine image to properly bill the customer.

Figure 4:
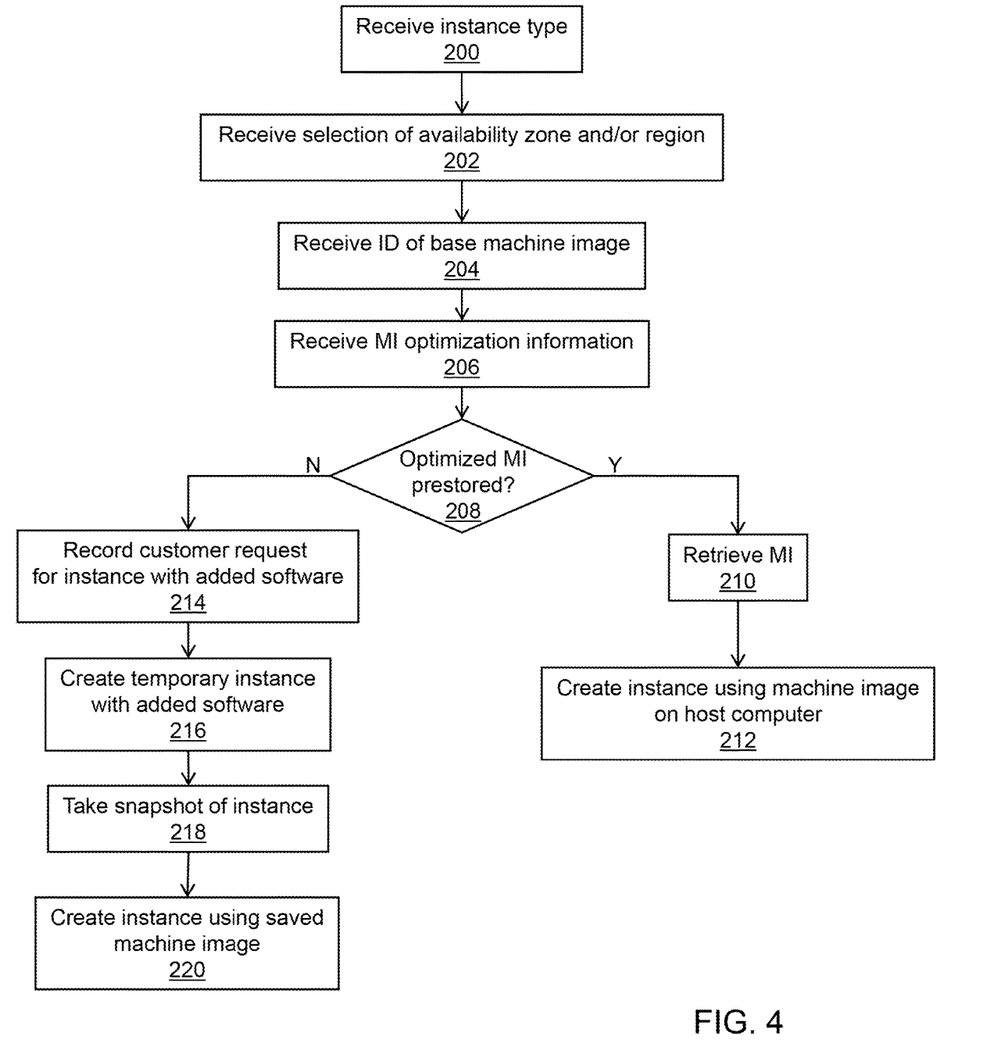
FIG. 4 shows a method in accordance with various embodiments.

FIG. 4 shows an example of a method in accordance with various embodiments. The operations may be performed in the order shown, or in a different order. Further, the operations may be performed serially, or two or more of the operations may be performed concurrently. In accordance with the disclosed embodiments, the management system 110 performs the method shown in FIG. 4. For example, the user interface 114 and provisioning service 116 may be executed on their respective computers 112 to implement the method. The method may be performed during the process of creating and launching an instance on behalf of a service provider customer and uses the machine image database example of FIG. 2 (machine image database 120*a*).

At 200, the method includes receiving the type of instance to be launched. The instance type may refer to the hardware configuration for the instance (e.g., number of CPUs, amount of memory, whether there is local versus remote storage, whether the instance is compute-optimized, memory-optimized, etc.). The user interface 114 may receive the instance type such as through an API submitted by the customer through a user device 170. The customer may submit the instance type through a GUI displayed in a web browser executing on the user device 170. The web browser may receive the information to render the GUI from the user interface 114 within the provider network's management system 110, and generate an API request containing the user-specified instance type to be returned to the user interface 114. In other examples, the instance type may be submitted through an API included in a script file, a command line interface, or other form of input to the user interface 114. The user interface 114 provides the instance type to the provisioning service 116. The instance type may be extracted from the API by the user interface, or the user interface may forward the API to the provisioning service 116.

Some service providers may implement regions and availability zones (e.g., physical or virtual data centers) within each region. Instances can be created in individual availability zones and thus the launch request for an instance may specify a particular availability zone, or even a specific region and availability zone within that region. At 202, the method includes receiving a selection of an availability zone, a region, or other type of instance location information. The availability zone selection may be specified in an API as described above with regard to specifying an instance type. The same API may specify both the instance type and the region/availability zone, or separate APIs may specify such information. The provisioning service 116 may receive the region/availability zone values from the user interface 114.

At 204, the method further includes receiving a machine image identifier. The machine image identifier may be input by a customer via his or her user device 170, for example, through a GUI rendered with information provided by the user interface 114, a script file, a command line interface, etc. The customer may select a desired machine image from a displayed list of machine images, each such machine image having information describing that machine image that the customer can use to decide an appropriate machine image to use to create the desired instance. The customer may select the machine image from the list, type its machine image identifier in a data entry field, or provide the identifier in any other suitable way to the user interface 114 and thus to the provisioning service 116. The machine image selected by the customer may be for a base machine image—one that does not contain the optimizations that the optimized machine images have that are stored in the machine image database 120.

At 206, the method includes receiving, by the user interface 114 and/or the provisioning service 116, machine image optimization information. In addition to the region and/or availability zone values, such information may include the identity of software to add to the machine image such as identifiers for packages, patches, applications, drivers, etc. The customer may select one or more identifiers for software through his or her user device 170 as described above (GUI, command line interface, script file, etc.). For example, the user interface 114 may provide security patch descriptions and identifiers to the web browser executing on the user device 170 for presentation to the customer. The customer may select one or more of the displayed security patches, which in turn causes an identifier associated with the selected security patch to be transmitted to the user interface 114 and/or provisioning service 116. Another example of machine image optimization information may be identifiers for software update bundles to fix bugs in the operating system within the selected machine image.

In some embodiments, operations 200-206 may be implemented as follows. A user may select a machine image to use to create an instance. The user may have apriori awareness of the particular machine image he or she desires, or may select from a list of machine images displayed on the user device 170 based on information generated and transmitted by the user interface 114 to the user device. The user then may issue an API request (e.g., to a "getmodifications" API) to the user interface, which may return identifiers for all software that can be added to the machine image. The user may submit another API request (e.g., to a "runinstance" API) which may pass instance type, machine image identifier, and identifiers of software to be added to the machine image.

At 208, method includes the provisioning service 116 determining whether a reference to an optimized machine image that corresponds to the base machine image identifier received at 204 bundled with the machine optimization information received at 206 exists in the machine image database 120*a*. This operation may be implemented by the provisioning service 116 accessing the machine image database 120*a* and determining whether a record exists that maps to the selected base machine image (using the column containing the corresponding base MI IDs 125) and that includes metadata that matches some or all of the machine image optimization information received at 206. The machine image database 120*a* may be implemented in content addressable memory (CAM) to permit searching its data for a match.

If a match is found, then at 210 the method includes retrieving the corresponding machine image from storage and at 212, the provisioning service 116 then creates a virtual machine instance using the optimized machine image on a host computer 150 suitable for hosting the particular instance. In some embodiments, operations 210 and 212 may include accessing database 120*a* to retrieve a machine image locator 128 in the record 122 that includes the base machine image ID 125 and the metadata 126 (e.g., the optimization information) specified by the customer. The machine image locater 128 then can be used to retrieve the optimized machine image from storage, load the optimized machine image on the target host computer and create a virtual machine instance based on that machine image.

In another embodiment, operations 210 and 212 may include accessing database 120*b* to retrieve a machine image locator in the record 122 that includes the base machine image ID 125 and the metadata 126 (e.g., the optimization information) specified by the customer. The machine image locater 128 then can be used to retrieve the base machine image from storage and the corresponding overlay is applied to the base machine image, with the resulting modified machine image loaded on the target host computer and a virtual machine instance then created based on that machine image.

If, however, a match is not found at 208 of the requested bundle of machine image and modifications, then at 214, the customer request for the particular instance to be created with the desired modifications is recorded. At 216, an instance is created as requested by the customer, but control and/or use of the instance is not granted to the customer. In some embodiments, the process for building and saving an optimized machine image is as follows. The provisioning service 116 launches an instance of the base machine image on the selected host computer and then generates scripts to install the various packages, software, and/or drivers on the instance. The provisioning service sends the scripts to an agent on the instance. The agent causes the packages, software, and drivers to install on the instance and the provisioning service tracks such installation.

The instance is created temporarily on a host computer. In one embodiment, the instance in operation 216 is created for the purpose of taking a snapshot of the instance to create a new virtual machine image. The instance may be created based on a base machine image corresponding to the customer's request. The customer-requested modifications may be applied to the instance to create the instance that the customer requested in operations 200-206.

At 218, a snapshot of the instance is taken. When the packages, software, and drivers are installed, the provisioning service invokes a snapshot API, that is an API that requests a snapshot to be taken of the temporary instance with the various modifications applied to it. A snapshot service executes within the provider network and, in response to the API, generates a list of blocks of the image that have changed from the base image, and stores the changed blocks or identifiers of the changed blocks in a snapshot record and stores the snapshot record in remote storage. The snapshot service also may generate a unique identifier for the blocks. An identifier of the set of optimizations and the identifier of the snapshot may be stored in database 120. The instance temporarily created at 216 may be terminated after the snapshot is taken.

At 220, the provisioning service then creates the instance for the customer using the machine image saved as part of operation 218. The process for creating the instance is described above. The machine image saved in operation 218 can be used to create the instance requested by the customer in operations 200-206, as all as future requests from the same or different customers for the same bundle of machine image and modifications.

Figure 5:
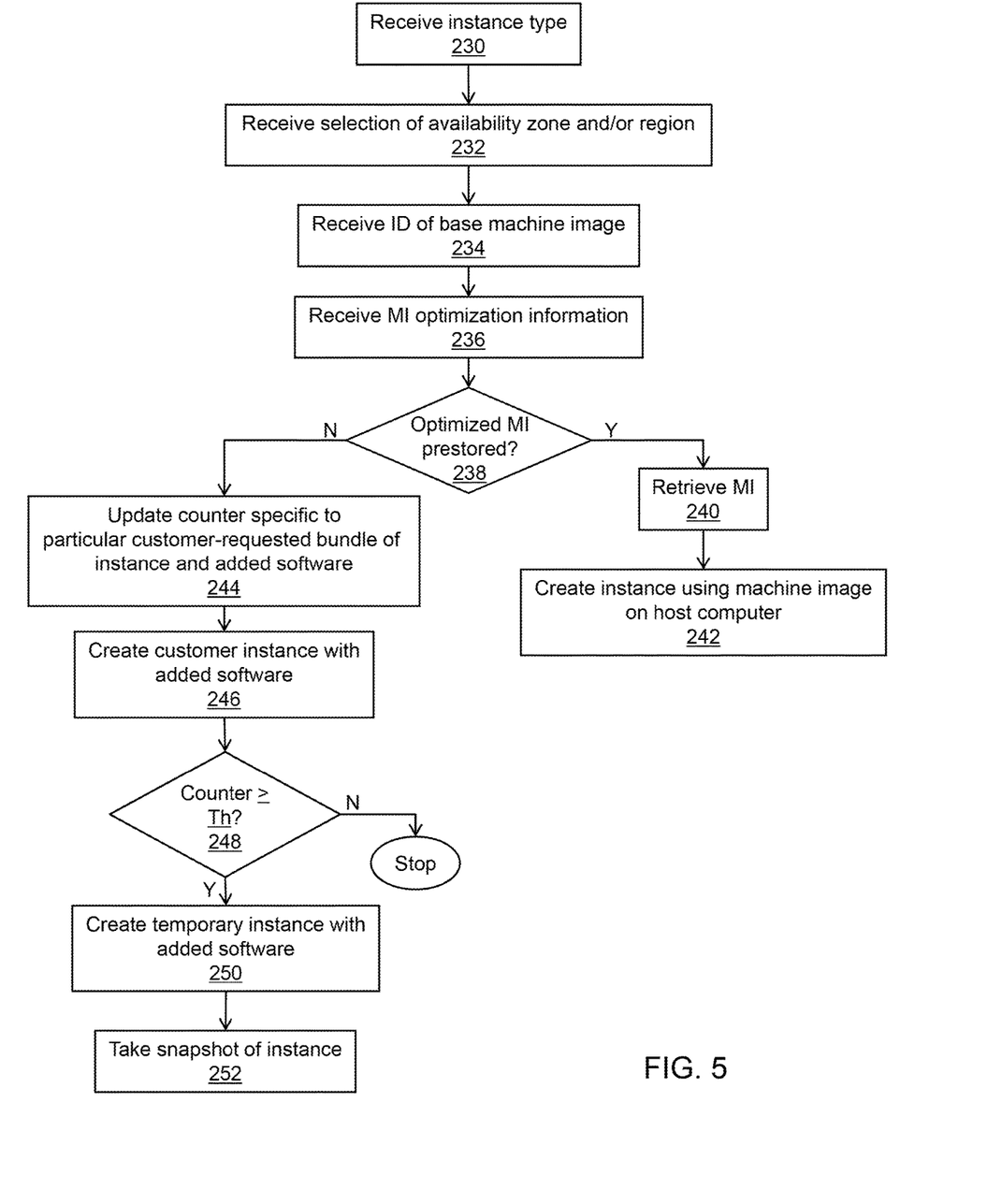
FIG. 5 shows another method in accordance with various embodiments.

FIG. 5 shows another embodiment similar to that of FIG. 4, but with a different process for saving creating an instance for a customer that requested a bundle of machine image and modifications that did not exist in storage in the provider network. Some of the operations in the example of FIG. 5 may be similar to or the same as corresponding operations of FIG. 4, and thus are not explained in as much detail as with regard to FIG. 4. The operations of FIG. 5 may be performed in the order shown, or in a different order. Further, the operations may be performed serially, or two or more of the operations may be performed concurrently. In accordance with the disclosed embodiments, the management system 110 may perform the method shown in FIG. 5. For example, the user interface 114 and provisioning service 116 may be executed on their respective computers 112 to implement the method.

At 230, 232, 234, and 236, the method includes the receipt of an instance type (230), a region and/or availability zone (232), an identifier of a base machine image (234), and optimization information for the specified machine image (236). At 238, the method includes the provisioning service 116 determining whether an optimized machine image that corresponds to the base machine image identifier received at 234 and the machine optimization information received at 236 exists in the machine image database 120*b*. This operation may be implemented by the provisioning service 116 accessing the machine image database 120 and determining whether a record exists that matches the selected base machine image ID and that includes metadata that matches some or all of the machine image optimization information received at 206.

If a match is found, then at 240 a machine image is retrieved and used at 242 to create an instance for the customer as requested. If, however, a match is not found, then at 244, a counter is updated. The counter may be specific to the particular bundle of machine image and modifications requested by the customer. That is, the number of times customers request a particular bundle is monitored to determine how frequently the bundle is requested. The counter may be initialized to 0 and may be incremented by 1 each time the corresponding bundle is requested. The counter may be re-initialized once per unit of time such as once per week, once per month, etc. A separate counter may be instantiated and updated for each different machine image-modification bundle.

At 246, the provisioning service creates the instance as requested by the customer including the optimizations the customer requested at 246. The process for creating the instance and applying the optimizations is described above. Control and use of the instance created at 246 is granted to the customer.

At 248, if the counter has reached a threshold value (which may be fixed or configurable), then a temporary version of the same instance with optimizations is created at 250 on another host computer, and a snapshot (described above) of the instance created at 250 is taken at 252 for future use when customers request the same bundle of machine image and optimizations. The instance temporarily created at 250 may be terminated after the snapshot is taken. The database 120 also may be updated to link the snapshot created at 252 to the corresponding base machine image so that the provisioning service 116 can find the optimized machine image the next time a customer requests a machine image with the same set of modifications.

Operations 244 and 248-252 pertain to the determination of whether a particular bundle of machine image and optimizations is requested frequently enough to warrant saving as a separate machine image and, if so, requesting the snapshot service to generate and save the snapshot. Operation 246 pertains to creating the customer-specific instance as the customer has requested and is generally performed separately from operations 244 and 248-252. That is, while operations 244-252 are shown sequentially, operation 244 and 248-252 may be performed concurrently with, before, after and generally independent from the customer instance creation operation 246.

In some embodiments, snapshots are taken of machine images with various modifications automatically as illustrated in FIGS. 4 and 5, or may be made as requested manually by a network administrator. For example, the process flow of FIGS. 4 and 5 may cause an alert message to be generated that informs a network administrator that a new machine image bundle has been created and/or the number of times that the machine image bundle has been created, and a request can then be initiated to create a version of the bundled machine image, request the snapshot service to create a snapshot of the instance and then terminate the instance.

In some embodiments, a customer may specify a particular type of instance type (e.g., type of hardware such as type and number of CPUs, amount of memory, etc.) and a particular machine image to be used to create an instance. The specified machine image, however, may not operate at all or not operate satisfactorily with the specified instance type. The provisioning service 116 may select an optimized machine image from the database 120 determined to be more suitable for the instance specified by the customer. In this case, the customer need not be aware of the appropriate machine image to use and the provisioning service takes care of the selection of the appropriate machine image for the customer. The selection of the more appropriate machine image for the customer may be based on the customer-specified instance type and the machine image that the customer did specify.

Figure 6:
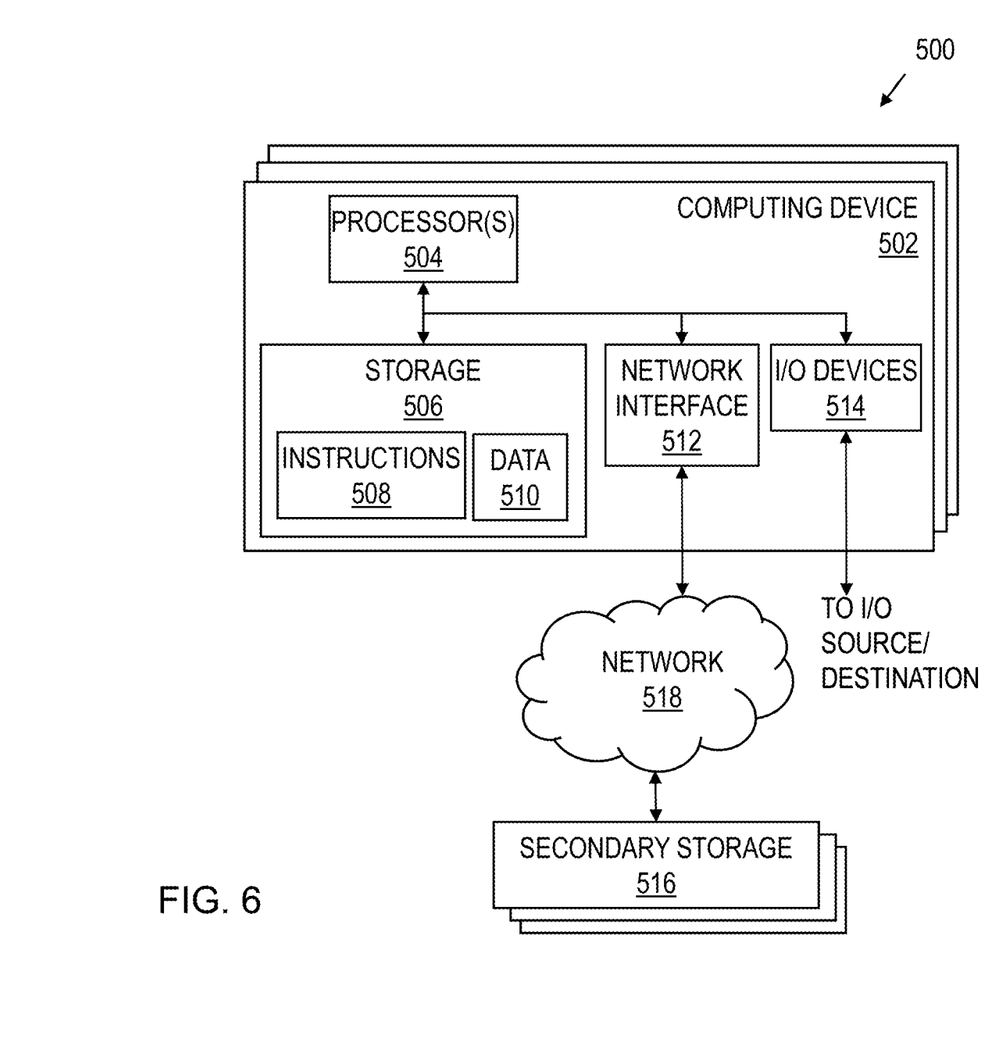
FIG. 6 shows a block diagram of a compute node in accordance with various embodiments.

FIG. 6 shows a schematic diagram for a computing system 500 suitable for implementation of the service provider network 100, including the functionality of the user interface 114 and provisioning service 116 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the user interface 114 and provisioning service 116.

Each computing device 502 includes one or more processors 504 coupled to memory 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage 506 may include a non-transitory, computer-readable storage device configured to store program instructions 508 and/or data 510 accessible by processor(s) 504. The storage 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage 506. For example, instructions 508 may include instructions that when executed by processor(s) 504 implement the user interface 114 and provisioning service 116 and/or other components of the service provider network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the provisioning service 180 and interface manager 183 and other components described herein may be implemented as a separate computing device 502 executing software to provide the computing node with the functionality described herein. In some embodiments, the user interface 114 and provisioning service 116 and other components may be implemented by the same computing node.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
   one or more computing nodes configured to implement a machine image database, a provisioning service, and an application programming interface (API) service in a provider network, wherein the machine image database includes a plurality of records, each record mapping a machine image identifier to a binary for a machine image;
   wherein the API service is configured to receive a request including an identifier of a base machine image and machine image optimization information; and
   wherein the provisioning service is configured to:
      use the identifier of the base machine image and the machine image optimization information to produce an optimized machine image using one or more binaries;
      cause the optimized machine image to be loaded onto a host computer instead of the base machine image corresponding to the received identifier;
      instantiate a counter specific to the base machine image and optimizations corresponding to the machine image optimization information;
      increment the counter with each receipt of a request specifying the base machine image and the optimizations;
      determine, based on a value of the counter, a frequency with which the base machine image and the optimizations are requested; and
      create a new machine image that includes the base machine image and the optimizations responsive to the frequency exceeding a threshold.

2. The system of claim 1, wherein the binary of a first record in the machine image database relates to the base machine image, and wherein the binary of a second record in the machine image database relates to an overlay to be applied to the base machine image to produce the optimized machine image.

3. The system of claim 1, wherein the provisioning service is configured to receive a first application programming interface (API) request that includes, as an input parameter, a machine image identifier, access a database to determine optimizations that are applicable to the machine image identified by the identifier, and return a list of the determined optimizations, each optimization in the list including an optimization identifier.

4. The system of claim 3, wherein the provisioning service is configured to receive a second API request that includes, as input parameters, the machine image identifier and at least one optimization identifier.

5. A system, comprising:
   one or more computing nodes configured to implement a machine image database and a provisioning service, wherein the machine image database includes a plurality of records, each record mapping a machine image identifier to a binary of a machine image;
   wherein the provisioning service is configured to:
      receive machine image optimization information;
      use an identifier of a base machine image and the machine image optimization information to produce an optimized machine image using one or more binaries of an optimized machine image from the machine image database;
      cause the optimized machine image to be loaded onto a host computer in response to a request received from a customer for a machine image, the request including one or more indicators for the machine image optimization information;
      instantiate a counter specific to the base machine image and optimizations corresponding to the machine image optimization information;
      increment the counter with each receipt of a request specifying the base machine image and the optimizations;
      determine, based on a value of the counter, a frequency with which the base machine image and the optimizations are requested; and
      create a new machine image that includes the base machine image and the optimizations responsive to the frequency exceeding a threshold.

6. The system of claim 5, wherein the optimization information includes at least one of a security patch identifier, an identifier for an application to be executed on the host computer, an application, or a driver.

7. The system of claim 5, wherein the binary of a first record in the machine image database relates to the base machine image, and wherein the binary of a second record in the machine image database relates to an overlay to be applied to the base machine image to produce the optimized machine image.

8. The system of claim 5, wherein the provisioning service is configured to create a temporary virtual machine instance with optimizations applied to the temporary virtual machine instance, request a snapshot to be taken of the temporary virtual machine instance with applied optimizations to create a new machine image, assign an identifier to the new machine image, terminate the temporary virtual machine instance, and create a virtual machine instance for a customer that requests a virtual machine instance with the optimizations using the new machine image.

9. The system of claim 8, wherein the provisioning service is configured to terminate the temporary virtual machine instance without an application program being loaded on to the temporary virtual machine instance.

10. The system of claim 5, wherein the provisioning service is configured to determine that the counter exceeds a threshold, create a temporary virtual machine instance with the optimizations, request a snapshot to be taken of the virtual machine instance with the optimizations to create a new machine image, and assign an identifier to the new machine image.

11. The system of claim 5, wherein the binary of a first record in the machine image database is of the base machine image, and wherein the provisioning service is configured to produce the optimized machine image through selection of a binary from a second record in the machine image database that maps to the binary of the first record and that includes the machine image optimization information.

12. The system of claim 5, wherein the binary in one record of the machine image database is of a first base machine image, and wherein the binaries in multiple other records in the machine image database are for different optimized versions of the first base machine image.

13. The system of claim 5, wherein one or more of the records in the machine image database include binaries of different base machine images, and wherein the binaries in multiple other records in the machine image database are for different optimized versions of the base machine images.

14. A method, comprising:
receiving, by a computing device, an identifier of a base machine image;
receiving, by the computing device, identifiers of machine image modifications;
using the machine image modification identifiers, determining that a database contains a binary of a modified machine image, the modified machine image being a modified version of the base machine image;
retrieving the binary from a database record;
producing the modified machine image;
loading the modified machine image on a host computer;
instantiating a counter specific to the base machine image and the machine image modifications;
incrementing the counter with each receipt of a request specifying the base machine image and the machine image modifications;
determining, based on a value of the counter, a frequency with which the base machine image and the machine image modifications are requested; and
creating a new machine image that includes the base machine image and the machine image modifications responsive to the frequency exceeding a threshold.

15. The method of claim 14, wherein producing the modified machine image comprises retrieving an overlay from the database and applying the overlay to the base machine image.

16. The method of claim 14, further comprising receiving an application programming interface (API) request that includes the identifier of the base machine image and responding with a list of the machine image modifications that can be applied to the base machine image.

17. The method of claim 14, wherein the machine image modification identifiers include at least one of a security patch identifier, an identifier for an application to be executed on the host computer, an application, or a driver.

18. The method of claim 14, wherein the base machine image and the modified machine image have a common operating system, and the modified machine image has a security patch that the base machine image does not have.

* * * * *